United States Patent Office.

WALDRON J. CHEYNEY, OF WALLINGFORD, AND EMIL F. DIETERICHS, OF PHILADELPHIA, PENNSYLVANIA.

Letters Patent No. 69,316, dated October 1, 1867; antedated September 20, 1867.

IMPROVED PLATE PORCELAIN.

*The Schedule referred to in these Letters Patent and making part of the same.*

TO ALL WHOM IT MAY CONCERN:

Be it known that we, WALDRON J. CHEYNEY, of Wallingford, Delaware county, and EMIL F. DIETERICHS, of the city and county of Philadelphia, both of the State of Pennsylvania, have invented a new and useful article of manufacture, which we call "Plate Porcelain;" and we do hereby declare that the following is a full and exact description of the same.

Our material may be used for facing the walls of buildings either inside or outside; for mantels, table-tops, counter-tops, surbases and wash-boards, door and transom-window lights, skylights, green-house lights, screens, shades, transparencies, photograph plates, door-shields, and for the general purposes to which ground plate glass, thick or thin, also white or opaque glass, or semi-opaque glass have been heretofore applied; also for tomb-stones.

Our plate porcelain is composed of cryolite or its chemical equivalents, and silica alone, or in combination with the white oxide of zinc, the whole fused together in a crucible, and cast in the same way as plate glass; or it may be blown into cylinders, cut, and flattened in the same manner as is now practised in the manufacture of window-glass.

In making our plate porcelain we have found the following combination and proportions to answer well, (although the oxide of zinc may be omitted, or another metallic oxide substituted for it, or the proportions of the other minerals varied without material detriment; if the cryolite is materially diminished, an alkali must be added:) Fifty pounds of sand, (silicious,) twenty pounds of cryolite, (powdered,) five pounds of white oxide of zinc.

Having thus described our invention, we claim, and desire to secure by Letters Patent, as a new article of manufacture—

"Plate porcelain," composed of cryolite or its chemical equivalents, and silica alone, or cryolite or its chemical equivalents, in combination with silica and a metallic oxide, or an alkali, or both, fused and cast on a table, and rolled or blown into cylinders, and cut and flattened as above described.

WALDRON J. CHEYNEY,
E. F. DIETERICHS.

Witnesses:
GEO. E. BUCKLEY,
F. B. KENNER.